(12) United States Patent
Scalli

(10) Patent No.: US 10,648,779 B1
(45) Date of Patent: May 12, 2020

(54) FOREARM-SECURED PORTABLE WEAPON SHIELD

(71) Applicant: Robert S. Scalli, Charlestown, MA (US)

(72) Inventor: Robert S. Scalli, Charlestown, MA (US)

(73) Assignee: Elle Scalli, Winthrop, MA (US)

( * ) Notice: Subject to any disclaimer, the term of this patent is extended or adjusted under 35 U.S.C. 154(b) by 0 days.

(21) Appl. No.: 16/552,731

(22) Filed: Aug. 27, 2019

(51) Int. Cl.
*F41H 5/08* (2006.01)
*B32B 15/18* (2006.01)

(52) U.S. Cl.
CPC .............. *F41H 5/08* (2013.01); *B32B 15/18* (2013.01); *B32B 2571/02* (2013.01)

(58) Field of Classification Search
CPC ... F41H 5/08; F41H 5/10; B32B 15/18; B32B 2571/02
USPC ............................................. 89/36.05, 36.07
See application file for complete search history.

(56) References Cited

U.S. PATENT DOCUMENTS

| | | | |
|---|---|---|---|
| 3,370,302 A * | 2/1968 | Karlyn | F41H 5/08 2/2.5 |
| 4,681,171 A | 7/1987 | Kee et al. | |
| 5,241,703 A * | 9/1993 | Roberts | F41H 5/08 109/49.5 |
| 6,990,887 B1 * | 1/2006 | O'Donnell | F41H 5/08 89/36.02 |
| 2011/0226123 A1 * | 9/2011 | Priebe | F41H 5/08 89/36.02 |
| 2018/0202771 A1 * | 7/2018 | Armellino, Jr. | F41H 5/08 |

FOREIGN PATENT DOCUMENTS

GB    2221286    * 1/1990

* cited by examiner

*Primary Examiner* — Stephen Johnson
(74) *Attorney, Agent, or Firm* — Sunstein LLP

(57) ABSTRACT

Provided is a portable weapon shield configured for securing to the forearm of a human subject. The shield includes a base having a length sufficient to align with a substantial portion of the forearm. The shield also includes a handgrip affixed to the back of the base in a location defining a proximal portion of the base, and a pair of rails affixed to the back of the base at the distal portion thereof. The shield includes a set of adjustable straps threaded through the rails to form a set of loops. The straps are configured to support the base when the forearm is inserted through the loops in a manner so that a hand associated with the forearm is gripping the handgrip. The shield includes a resilient padding layer mounted to the back of the base to protect against trauma to the forearm caused by the directed threat.

17 Claims, 5 Drawing Sheets

FOREARM-SECURED PORTABLE WEAPON SHIELD

TECHNICAL FIELD

The present invention relates to weapon shields, particularly to weapon shields that can be wielded to protect individuals.

BACKGROUND ART

The use of weapon shields has been known since ancient times. Typical ancient shields had large dimensions, and served as a barrier placed in front of large regions of the body. Such shields were commonly made of wood and leather. Bronze shields were sometimes used, but ran the risk of fracture and breaking.

SUMMARY OF THE EMBODIMENTS

In accordance with one embodiment of the present invention, there is provided a portable weapon shield configured to be secured to the forearm of a human subject. The shield includes a base having a length sufficient to align with a substantial portion of the forearm of the human subject. The base has a front and a back and a pair of opposed sides and is configured to mitigate a directed threat. The shield also includes a handgrip affixed to the back of the base in a location defining a proximal portion of the base. The proximal portion being distinct from a distal portion of the base. The shield further includes a pair of rails affixed to the back of the base at the distal portion thereof, with a first rail affixed to a first one of the sides and a second rail affixed to a second one of the sides. The shield also includes a set of adjustable straps threaded through the pair of rails and forming a set of loops. The straps are configured to support the base when the forearm of the human subject is inserted through the set of loops in a manner so that a hand of the human subject associated with the forearm is gripping the handgrip. The shield also includes a layer of resilient padding mounted to the back of the base to protect against trauma to the forearm caused by the directed threat. The base has a width at the proximal portion that is greater than a width at the distal portion.

Optionally, the base is made of ballistic grade steel. Optionally, the proximal portion is rectangular and the distal portion is trapezoidal. Optionally, the shield further includes a spalling pad affixed to the front of the base and configured to mitigate spalling of projectiles intercepted by the shield. Alternatively or additionally, the spalling pad is made of high durometer rubber. Alternatively or additionally, the spalling pad is attached to the front of the base by neoprene glue.

Optionally, the resilient padding is closed cell foam. Alternatively or additionally, the resilient padding is attached to the back of the base by a polyurethane adhesive. Optionally, the shield further includes an endcap positioned at an end of the handgrip. The endcap reducing the risk of slippage of the hand from the handgrip. Optionally, the first rail has a first set of slots and the second rail has a second set of slots, wherein each slot of the first set is positioned parallel to a corresponding slot of the second set. Alternatively or additionally, one of the adjustable straps is attached to the shield by being threaded through a slot of the first set and the corresponding slot of the second set.

Optionally, each rail is made of steel and is welded to the base. Optionally, the handgrip is made of steel and is welded to the base. Optionally, the base, the resilient padding, the rails, and the handgrip are protected with a polyurethane/polyurea elastomer coating. Optionally, the shield further includes a flashlight assembly mounted to the handgrip. Optionally, the shield further includes a rifle sling attached to the shield using the pair of rails. Optionally, the shield further includes a serial number marked on the front of the shield.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "set" includes at least one member.

A "directed threat" is a ballistic threat or a manually wielded weapon.

A "ballistic threat" includes a projectile fired by a weapon, a knife or other object thrown by an attacker, and any other object that can be launched against a subject.

A "manually wielded" weapon is an object directed by an attacker against a human subject with intent to cause harm.

To "mitigate" a ballistic threat is to intercept the threat, or to reduce an adverse consequence of the threat.

Figure 1:
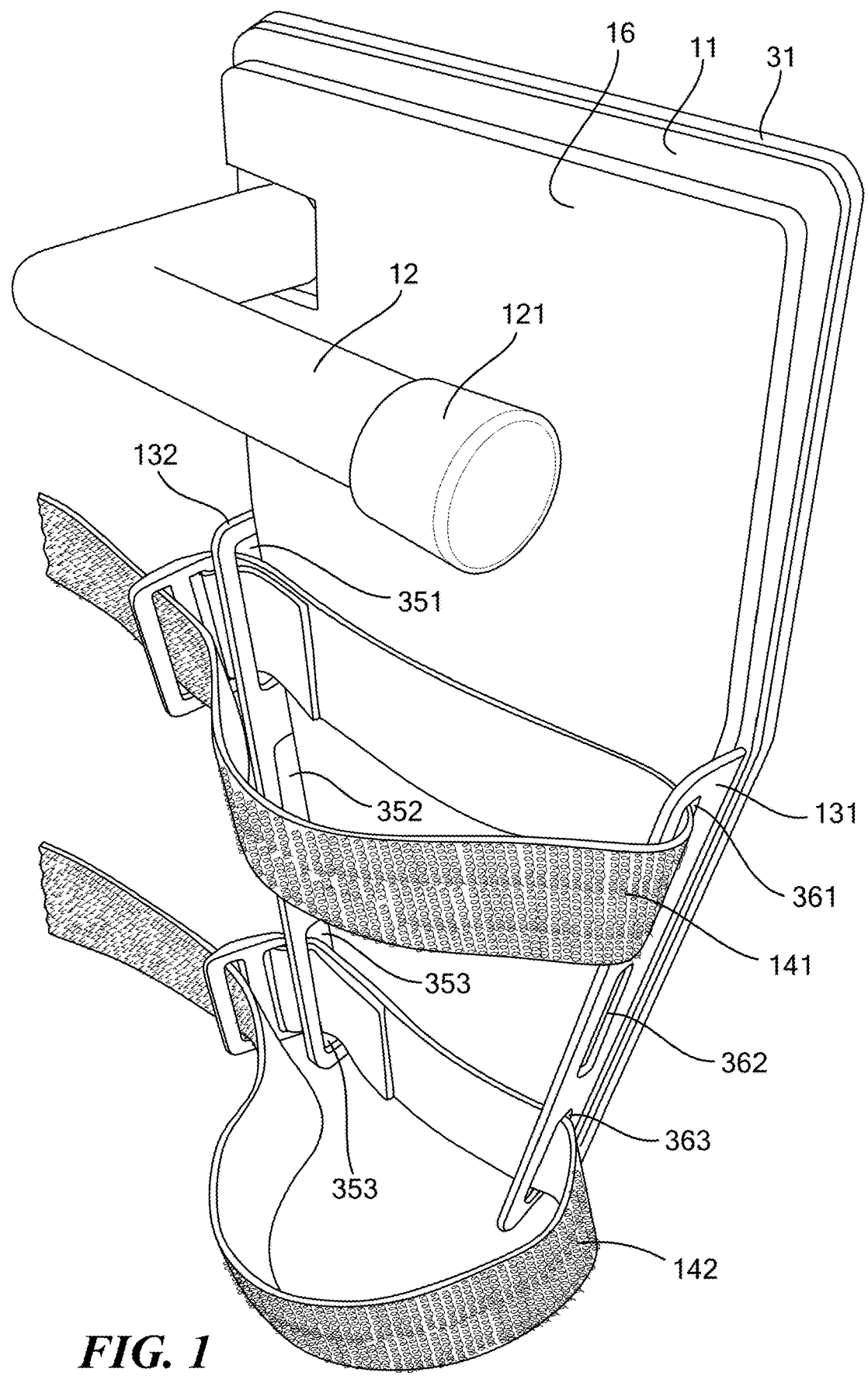
FIG. 1 is a perspective back view of a weapon shield in accordance with an embodiment of the present invention.

FIG. 1 is a perspective back view of a weapon shield in accordance with an embodiment of the present invention. The shield has a base 11 that is of sufficient length to align with a substantial portion of a forearm of a human subject. A handgrip 12 is affixed to the back of the base 11 in a location defining a proximal portion of the base 11. (We refer to the remaining portion of the base as the "distal" portion.) A pair of rails 131, 132 is affixed to the back of the base 11 at the distal portion thereof. The base 11 has a width, at the proximal portion, that is greater than a width at the distal portion. In this embodiment, the proximal portion of the base 11 is rectangular, and the distal portion of the base 11 is trapezoidal in a manner providing width that is tapered to a smaller dimension than the proximal portion. In this embodiment, base 11 is made of ballistic grade steel, such as AR600, of a thickness and hardness to stop many kinds of bullets and other projectiles, as well as other ballistic threats and manually wielded weapons.

The spalling pad 31 on the front of the base 11 serves to mitigate spalling of projectiles, including bullets, that are intercepted by the shield. In this embodiment, the spalling pad 31 is made of high durometer rubber (such as from recycled rubber tires) and is attached to the front of the base 11 by neoprene glue. The resilient padding 16 on the back of the base 11 serves as a trauma pad that allows the shield to absorb an impact of a directed threat, such as a bullet fired by a gun. In this embodiment, the resilient padding 16 is made of closed cell EVA foam. The resilient padding 16 is attached to the back of the base with a polyurethane adhesive, which in some embodiments is sprayed.

The handgrip 12, which in this embodiment is steel and welded to the back of the base 11, enables a human subject to securely grip and hold the shield in responding to a directed threat. The handgrip 12 includes an endcap 121 that reduces the risk of slippage of the gripping hand from the handgrip 12.

A pair of rails 131, 132 is also affixed to the back of the base 11 at the distal portion of the base 11. In this embodiment, each rail 131, 132 is made of steel and welded to the base 11. The first rail 131 is affixed to a first side, and includes three slots 361, 362, 363. The second rail 132 is affixed to a second side, parallel to the first rail 131, and includes three slots 351, 352, 353. Each slot 361, 362, 363 of the first rail 131 is aligned with a corresponding slot 351, 352, 353 on the second rail 132, such that adjustable straps 141, 142 can be attached to the shield. To attach to the shield, the adjustable straps 141, 142 are threaded through the rails 131, 132 to form a set of loops. In the embodiment of FIG. 1, two adjustable straps 141, 142 are attached to the shield. The first strap 141 is threaded through the first slot 361 of the first rail 131 and the first slot 351 of the second rail 132. The second strap 142 is threaded through the third slot 363 of the first rail 131 and the third slot 353 of the second rail 132. The straps 141, 142 are configured to support the base 11 when the forearm of a human subject is inserted through the set of loops in a manner so that a hand of the human subject associated with the forearm is gripping the handgrip 12.

The entire shield, including the base 11, the resilient padding 16, the rails 131 and 132, the handgrip 12, and the spalling pad 31, are, after assembly, protected with an polyurethane/polyurea elastomer coating, such as available from LINE-X, Huntsville, Ala. 35824.

Figure 2:
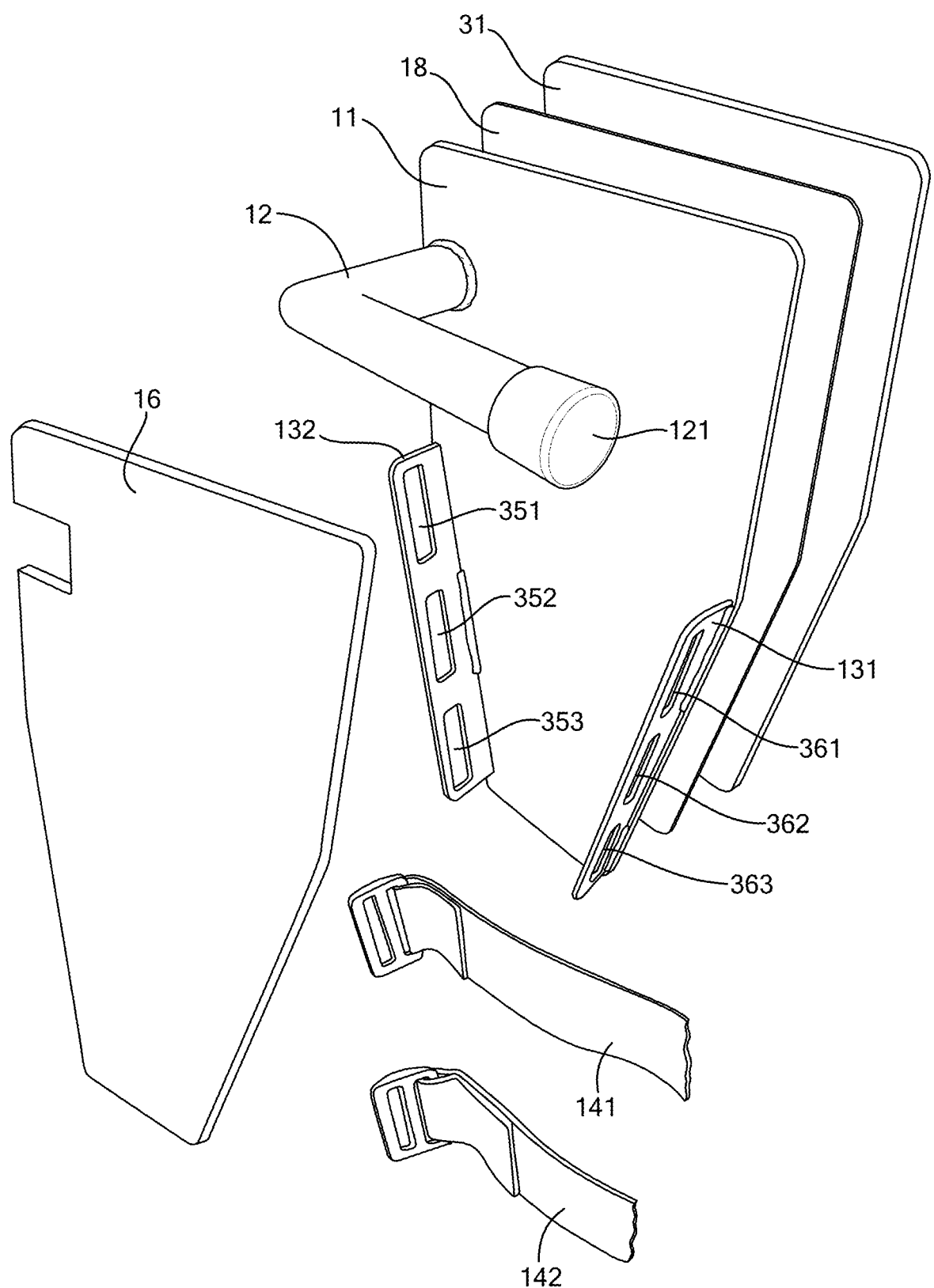
FIG. 2 is an exploded back view of the shield of FIG. 1.

FIG. 2 is an exploded back view of the shield of FIG. 1. FIG. 2 shows that the spalling pad 31 is of similar size and shape as the base 11. The spalling pad 31 is attached to the front of the base 11 by a glue layer 18. In this embodiment, the glue layer 18 is made of neoprene glue. FIG. 2 also shows the rails 131 and 132 and the handgrip 12 are welded to the base 11. FIG. 2 further shows that the resilient padding 16 is of a smaller size and similar shape as the base 11, and, in this embodiment, is attached to the back of the base 11 by polyurethane adhesive. The resilient padding 16 is constructed to fit around the rails 131, 132 and the handgrip 12 when attached to the back of the base 11.

Figure 3:
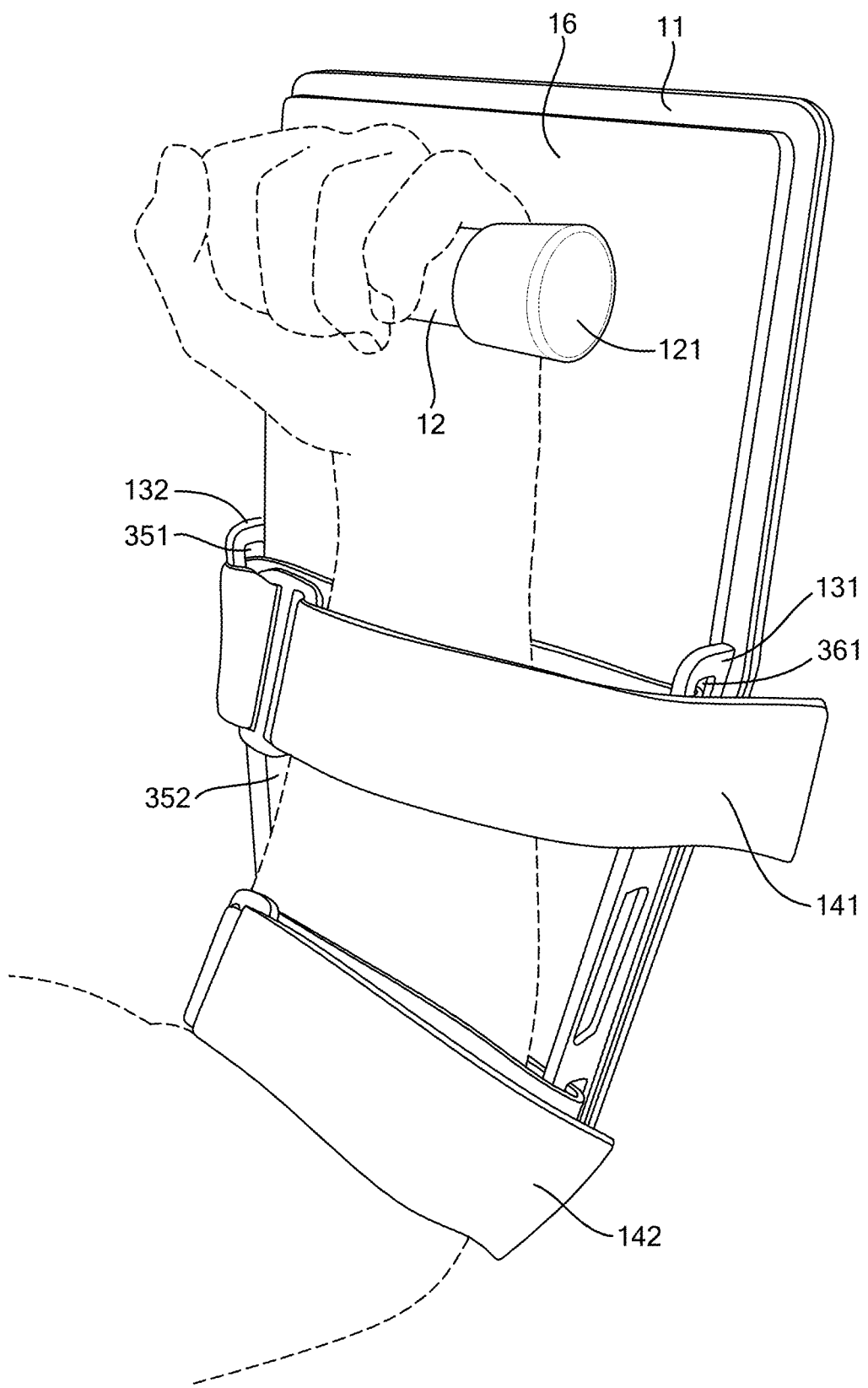
FIG. 3 is a perspective back view of the shield of FIG. 1 with a forearm inserted into the shield.

FIG. 3 is a perspective back view of the shield of FIG. 1 with a forearm inserted into the shield. FIG. 3 shows the first strap 141 threaded through the first slot 361 of the first rail 131 and through the first slot 351 of the second rail 132 to form a first loop, and the second strap 142 threaded through the third slot 363 of the first rail 131 and through the third slot 353 of the second rail 132 to form a second loop. The forearm of a human subject is inserted into each of the loops formed by the straps 141, 142 in a manner that allows the hand of the human subject to securely grip the handgrip 12. The endcap 121 of the handgrip 12 reduces the risk of slippage of the gripping hand from the handgrip 12. The straps 141, 142 are adjusted so that the forearm and hand of the human subject can support the base 11 in a manner to shield the upper body of the human subject during a directed threat. The resilient padding 16 protects against trauma to the forearm caused by a direct threat mitigated by the shield.

Figure 4:
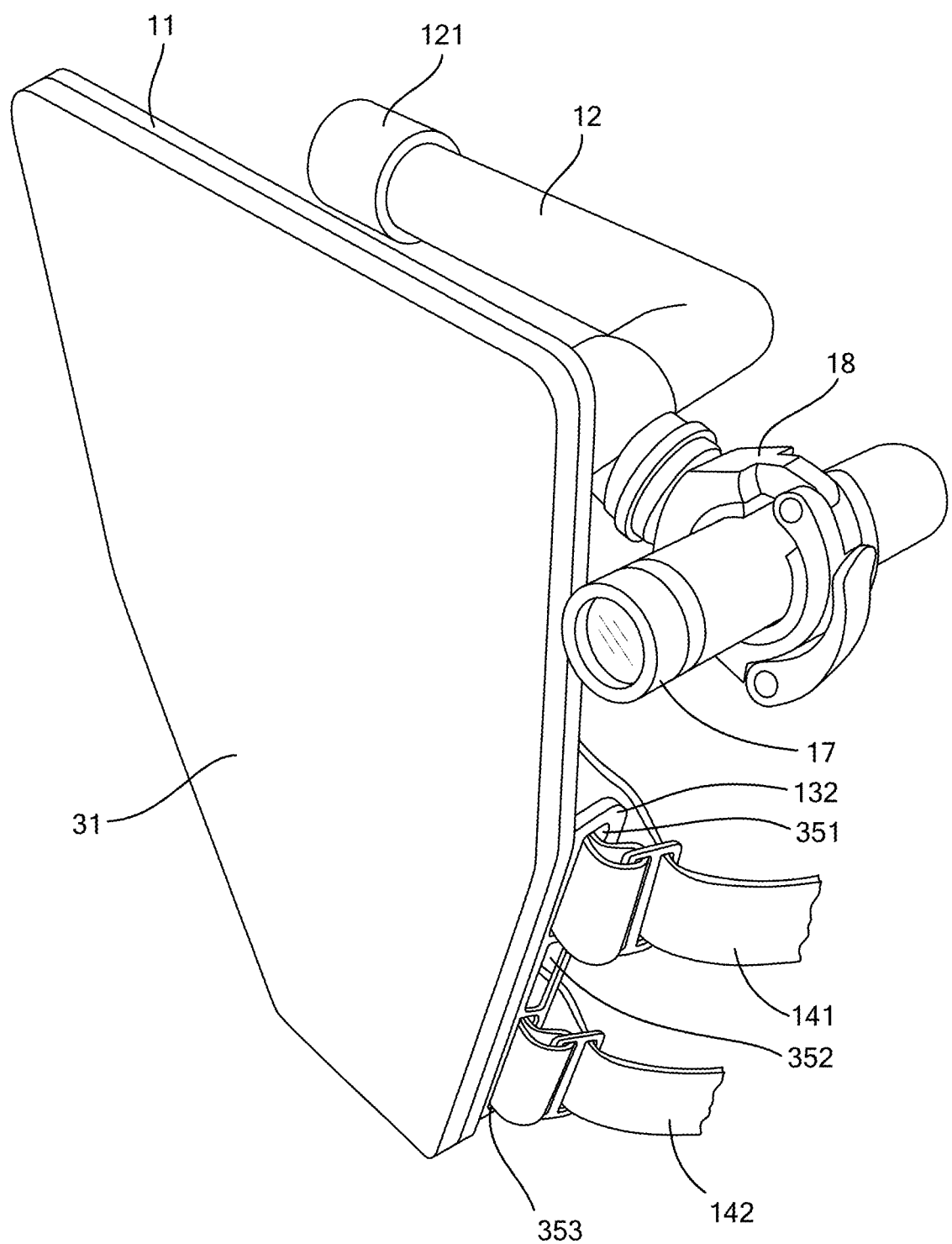
FIG. 4 is a perspective front view of the shield of FIG. 1.

FIG. 4 is a perspective front view of the shield of FIG. 1. FIG. 4 shows a full view of the spalling pad 31 that is attached to the front of the base 11. As described above, the spalling pad 31 serves to mitigate spalling of projectiles that are intercepted by the shield. This embodiment also includes an assembly mount 18, attached to the handgrip 12, that fastens a flashlight 17 to the shield. Such embodiment serves to mitigate against directed threats in locations with limited light and also potentially interfere with vision of the attacker. In other embodiments, a rifle sling may be attached to the shield using the slots of the first and second rails 131, 132.

Figure 5:
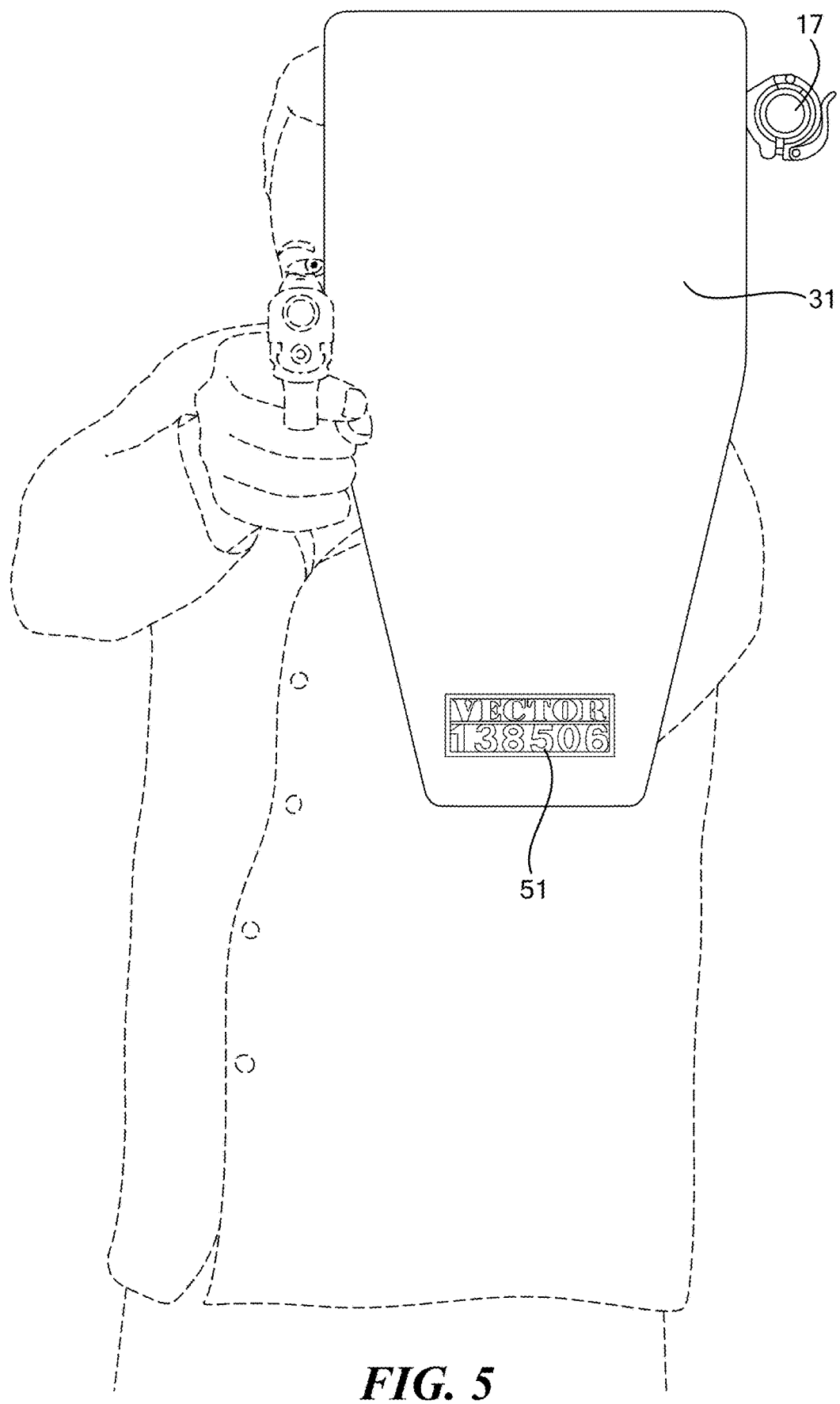
FIG. 5 is a perspective front view of the shield of FIG. 1 in a deployment position.

FIG. 5 is a perspective front view of the shield of FIG. 1 in a deployment position. As shown in FIG. 5, the shield may be wielded during a direct threat to intercept a projectile aimed at the body of a human subject. The materials used to construct the shield make the shield of a weight that can be wielded by the human subject, such as a law enforcement official, while still taking counteractions against a direct threat. As shown in FIG. 5, while interposing the shield, the human subject may still operate a gun as counteraction against the threat. The shield may be deployed to mitigate a considerable range of directed threats. The resilient padding 16 that constitutes the trauma pad is configured to absorb some of the shock to the forearm caused by ballistic threats. In the embodiment of FIG. 5, a serial number 51 is marked on the front of the shield, which allows identifying a particular shield that has been distributed. Typically, the shield is registered with a law enforcement organization and may be additionally registered by manufacturer to facilitate association of the shield with a particular law enforcement organization.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A portable weapon shield, configured to be secured to a forearm of a human subject, the shield comprising:
    a base having a front and a back and a pair of opposed sides, the base configured to mitigate a directed threat;
    a handgrip affixed to the back of the base in a location defining a proximal portion of the base, the proximal portion being distinct from a distal portion of the base;
    a pair of rails affixed to the back of the base at the distal portion thereof, with a first rail affixed to a first one of the sides and a second rail affixed to a second one of the sides;
    a set of adjustable straps threaded through the pair of rails and forming a set of loops, the straps configured to support the base when the forearm of the human subject is inserted through the set of loops in a manner so that a hand of the human subject associated with the forearm is gripping the handgrip;
    wherein, when the hand is gripping the handgrip and oriented vertically, the base extends vertically upward beyond the handgrip and vertically downward below an elbow of the subject, the base having a width at the proximal portion that is greater than a width at the distal portion; and
    a layer of resilient padding mounted to the back of the base to protect against trauma to the forearm caused by the directed threat.

2. A portable shield according to claim 1, wherein the base is made of ballistic grade steel.

3. A portable shield according to claim 1, wherein the proximal portion is rectangular and the distal portion is trapezoidal.

4. A portable shield according to claim 1, further comprising a spalling pad affixed to the front of the base and configured to mitigate spalling of projectiles intercepted by the shield.

5. A portable shield according to claim 4, wherein the spalling pad is made of hard rubber.

6. A portable shield according to claim 4, wherein the spalling pad is attached to the front of the base by neoprene glue.

7. A portable shield according to claim 1, wherein the resilient padding is closed cell foam.

8. A portable shield according to claim 1, wherein the resilient padding is attached to the back of the base by a polyurethane adhesive.

9. A portable shield according to claim 1, further comprising an endcap positioned at an end of the handgrip, the endcap reducing a risk of slippage of the hand from the handgrip.

10. A portable shield according to claim 1, wherein the first rail has a first set of slots and the second rail has a second set of slots, wherein each slot of the first set is positioned parallel to a corresponding slot of the second set.

11. A portable shield according to claim 10, wherein one of the adjustable straps is attached to the shield by being threaded through a slot of the first set and the corresponding slot of the second set.

12. A portable shield according to claim 1, wherein each of the rails is made of steel and is welded to the base.

13. A portable shield according to claim 1, wherein the handgrip is made of steel and is welded to the base.

14. A portable shield according to claim 1, wherein the base, the resilient padding, the rails, and the handgrip are protected with a polyurethane/polyurea elastomer coating.

15. A portable shield according to claim 1, further comprising a flashlight assembly mounted to the handgrip.

16. A portable shield according to claim 1, further comprising a rifle sling attached to the shield using the pair of rails.

17. A portable shield according to claim 1, further comprising a serial number marked on a front of the shield.

* * * * *